US010023399B2

(12) United States Patent
Armellin et al.

(10) Patent No.: US 10,023,399 B2
(45) Date of Patent: Jul. 17, 2018

(54) GRIPPERS FOR THERMOPLASTIC CONTAINERS

(71) Applicant: S.I.P.A. Società Industrializzazione Progettazione e Automazione S.P.A., Vittorio Veneto (IT)

(72) Inventors: Alberto Armellin, Vittorio Veneto (IT); Sandro Serra, Oderzo (IT); Mirco Tonon, San Fior (IT); Michele Varaschin, Vittorio Veneto (IT); Matteo Zoppas, Conegliano (IT)

(73) Assignee: S.I.P.A. Societa' Industrializzazione Progettazione e Automazione S.P.A., Vittorio Veneto (IT)

( * ) Notice: Subject to any disclaimer, the term of this patent is extended or adjusted under 35 U.S.C. 154(b) by 335 days.

(21) Appl. No.: 14/916,773

(22) PCT Filed: Sep. 4, 2014

(86) PCT No.: PCT/IB2014/064248
§ 371 (c)(1),
(2) Date: Mar. 4, 2016

(87) PCT Pub. No.: WO2015/033289
PCT Pub. Date: Mar. 12, 2015

(65) Prior Publication Data
US 2016/0214803 A1    Jul. 28, 2016

(30) Foreign Application Priority Data

Sep. 4, 2013    (IT) .............................. RM2013A0490

(51) Int. Cl.
B29C 49/42    (2006.01)
B65G 47/86    (2006.01)
(Continued)

(52) U.S. Cl.
CPC ............ B65G 47/847 (2013.01); B29C 49/06 (2013.01); B29C 49/36 (2013.01);
(Continued)

(58) Field of Classification Search
CPC .................................................. B29C 49/4205
See application file for complete search history.

(56) References Cited

U.S. PATENT DOCUMENTS 2,272,592 A    2/1942    Lester et al.

FOREIGN PATENT DOCUMENTS

AU    1052470    7/1971
DE    1482616    1/1969
(Continued)

OTHER PUBLICATIONS

International Search Report and Written Opinion dated Jan. 15, 2015 for corresponding PCT patent application No. PCT/IB2014/064248.

*Primary Examiner* — Jill L Heitbrink
(74) *Attorney, Agent, or Firm* — Abelman, Frayne & Schwab

(57) ABSTRACT

A plant for the production of containers made of PET comprises at least one rotary carousel for the production of preforms (2) and at least one zone, in which the preforms are either stored or they may be blown on another rotary carousel. The molded preforms are extracted from the carousel (2) by means of a transfer starwheel (50) provided with grippers (4) capable of performing complex translating-rotating type movements and independent grasping movements. The grippers (4) are provided with two suction jaws (90a and 90b) to make the grasping of the preforms more reliable when they are released from the rotary carousel for the production of the preforms (2).

13 Claims, 10 Drawing Sheets

(51) Int. Cl.
   *B29C 49/06*   (2006.01)
   *B29C 49/36*   (2006.01)
   *B29C 49/02*   (2006.01)
   *B29K 667/00*   (2006.01)
   *B29L 31/00*   (2006.01)

(52) U.S. Cl.
   CPC .... *B29C 49/4205* (2013.01); *B29C 2049/028* (2013.01); *B29K 2667/003* (2013.01); *B29L 2031/7158* (2013.01)

(56) References Cited

FOREIGN PATENT DOCUMENTS

| | | |
|---|---|---|
| DE | 202008014089 | 1/2009 |
| WO | 01/44084 | 6/2001 |
| WO | 2013/062463 | 5/2013 | ns
GRIPPERS FOR THERMOPLASTIC CONTAINERS

CROSS REFERENCE TO RELATED APPLICATIONS

This application is a national phase of PCT application No. PCT/IB2014/064248, filed Sep. 4, 2014, which claims priority to IT patent application No. RM2013A000490, filed Sep. 4, 2013, all of which are incorporated herein by reference thereto.

FIELD OF THE INVENTION

The present invention relates to gripping elements for containers made of thermoplastic material, for example made of PET, in general used in plants for the production of preforms or containers.

STATE OF THE ART

The production of very high numbers of thermoplastic containers, in particular of bottles, is a process which starting from the raw material, generally polyethylene terephthalate or PET, allows to obtain finished containers of even particularly complex shape suited to the most varied market needs, and which are particularly light and strong even when subjected to heavy pressures at ambient temperature. The transition of PET in raw state in the form of granules to plastic container can be carried out either by means of a one-stage process or by means of a two-stage process, as desired.

The one-stage process is carried-out using a single system in which the transition of PET from granules to preform, by means of a step of injecting into molds, and the transition from preform to plastic container, by means of a step of stretching-blowing, occurs continuously without the preform being allowed to cool down completely to ambient temperature. The preform thus still preserves part of the latent heat remaining from the step of injecting, with a considerable saving of energy, because the preforms require less heat to be returned to the temperature suitable for blowing with respect to the case in which they must be heated starting from ambient temperature.

A so-called two-stage process, instead, is carried out in two plants which are generally but not necessarily separate: one production plant carries out the first part of the container production process with the step of injecting the PET preforms in injection molds. The second plant carries out the second part of the process, which transforms the preform into the final container in a blower using the stretching-blowing technique, which is generally used today for blowing PET containers. The two-stage process may also be carried out in the same plant, which includes injecting the preforms and blowing them into bottles, but the two operations are carried out at different times. The preforms are allowed to cool down after injection to reach ambient temperature. Subsequently, when the preforms are transformed into finished containers, in particular into bottles, they must be heated in appropriate ovens to take them back to the temperature required for the blowing process typical of the thermoplastic used or necessary for stretching-blowing, if PET is used.

One reason for preferring an integrated one-stage plant is that a plant of this kind ensures a better finished product quality with less consumption of energy, as previously mentioned. The possibility of modifying production parameters in real time, adapting them to the container production needs in quick, effective manner, allows for better finished product quality. Furthermore, in an integrated one-stage plant, a preform manufacturing error can be immediately detected, thus allowing to correct faults of the preform and/or the finished container. In two-stage plants, instead, a fault occurring on preforms during injection can be detected with such a delay to compromise several days of production. Moreover, the lack of continuity between the two stages prevents the storage of all the information of the preform life-cycle, so that the step of stretching-blowing occurs without knowing the exact features of the processed preforms at any time. Not less important is the problem which derives from preform contamination when the preforms are not immediately transformed into the final containers, if these are intended to contain a food product, thus compromising the shelf-life thereof.

Blow molding of containers is preferred today also because it is particularly suited for making hollow bodies of complex shape and with many undercuts, in particular for making elaborately shaped bottles for market reasons. Blowing has the great advantage of allowing the production of containers having the body much wider than the mouth, such as bottles and flasks. Furthermore, it is preferred over rotational molding because the production cycle, i.e. the cycle time, is shorter. Blowing is a particularly fast, efficient process, adapted to mass produce containers, such as bottles made of thermoplastic resin, and in particular made of PET, for beverages, for which the market demands particularly high production numbers, which may reach several million per season. Short cycle times allows to distribute plant cost over a very high number of items, thus allowing to achieve productions even in the order of several tens of thousand of containers per hour in the larger blowing plants. One of the problems still to overcome in the making of one-stage plants is their low productivity compared to two-stage systems, because the first part of the container production process, which is the preform injection process in multiple cavity molds, which is the most common process today, is much slower than the second part of the production process, which is the stretching-blowing process, so that the latter operation, in which very high production capacities can be already achieved, must be run at production capacities which are lower than the maximum capacity in order to keep it at the same level as the preform injection molding. A variant of the described technique, which appears most promising from the point of view of production capacity and produced preform quality, is the use of injection-compression technology which requires less power for operation and lower press tonnage for compressing the preform mold. Another advantage of this process is that it subjects the thermoplastic material to less stress, allowing to produce end containers with very thin walls, while ensuring a high container quality. It is easier to integrate the preform molding machine with a rotary blower for blowing the containers if a rotary platform is used to implement the injection-compression production cycle, instead of an alternating cycle typical of injection presses, to make an integrated one-stage system. Rotary starwheels comprising a rotational wheel provided with a series of grippers having either fixed or extendible arms, provided with jaws may be used to transfer the preforms or the final containers in plants consisting of several rotary carousels, i.e. that of the injection machine, of the cooling machine and of the blowing machine, and possibly of the labeling machine. These conveying systems require a high level of reliability and an operative picking and releasing speed which is comparable to the operative speed of the molding and blowing stations. Furthermore, particular care must be devoted to the handling itself of the preforms to avoid possible mechanical damage. The latter problem is particularly felt when handling very light preforms for particularly small size bottles, e.g. in the order of size of 0.5 liters, or even smaller.

On the other hand, a key element from the economic point of view is the cost of raw materials, for example PET, PE, PPE, PP, which is generally higher than that of the liquid contained therein, consequently reducing the amount of raw material used for producing a single container is crucial for the manufacturing industry in this sector, in which the trend is to produce increasingly lighter containers regardless of their volume. Therefore, the need is felt to make new rotary injection machines for thermoplastic preforms, in particular made of PET, which have components capable of operating with containers which satisfy the market request to increase productivity and to reduce preform costs, making them lighter without reducing quality.

SUMMARY OF THE INVENTION

It is the object of the present invention to provide an apparatus for the production of thermoplastic containers, in particular PET preforms, which solves the aforesaid problems. In particular, one of these problems concerns a higher automation capacity, a higher reliability, an increase of the preform transfer speed from one station to the other, the reduction of the maintenance times of these plants and their flexibility of use for various types of containers, either preforms or final bottles, which may be handled on the various machines.

These problems are solved according to our invention by using grippers for plastic containers adapted to be mounted on a specific brace, such grippers comprising:

a telescopic arm defining a first longitudinal axis formed by a first rail, adapted to be fixed by means of a support to said brace, and to rotate about a second axis perpendicular to said first longitudinal axis, and by a first slide, adapted to slide along said first longitudinal axis and provided with a free outer end, two arms having a free end onto which two respective jaws are bolted and a second end hinged by means of pins to the free end of the first slide, such arms being adapted to assume a first extreme position, in which they are clamped onto each other by means of a return spring, and a second extreme position, in which they are separated from each other by rotating about the pins, such arms being each provided with a roller free to rotate about a respective third axis perpendicular to the longitudinal axis of the gripper;

a second slide, adapted to slide longitudinally along the first slide, and be wedged between the two rollers, thus separating the free ends of the two arms and, thus the two jaws, from each other characterized in that it includes:
a first cam mechanism to make said telescopic arm rotate about the second axis (Y"),
a second cam mechanism to make the first slide (81) run on the first rail (82), said first slide (81) having an inner end supported by the first rail (82) during its movement,
and a third cam mechanism to make the second slide (83) run on the first slide (81).

The gripper according to the invention can approach the preform to be handled with great accuracy by virtue of the capacity of performing complex movements resulting from the combination of the rotary system of the telescopic arm and of the translating system of the first slide, which can be advantageously made of two simple cam mechanisms. After having ended the approach, the gripper can grasp the preform, again with great accuracy, by virtue of the translating movement of the second slide, which can also be controlled by a cam mechanism, and by virtue of the suction system which guides the preform into its seat between the two jaws. Such a suction system is particularly suitable for grasping preforms for small capacity bottles, approximately 0.5 liters, for example, which are thus very light and could be disturbed when dropped towards the grippers in case of air turbulence when the machines move at particularly high speed.

Advantageously, all the generation mechanisms of the various movements are of the cam type with independent tracks.

Finally, by virtue of the features of the invention, a high accuracy, high reliability transfer starwheel of preforms or bottles can be made, having a high degree of automation and a faster rotation speed, and requiring simpler maintenance.

According to an aspect, the invention provides a transfer starwheel for thermoplastic preforms for a container production plant, which comprises a cylindrical carousel defining an upper disc and a lower disc, which are concentric to each other, and a plurality of grippers as described above, radially fixed along the periphery of the lower disc, and wherein the suction system is placed in the middle of the outer surface of the upper disc.

According to a further aspect, the invention provides a continuous cycle, rotary-type plant for the production of plastic containers, in particular of PET preforms, comprising at least one preform injection-compression station and at least one transfer starwheel as described above.

BRIEF DESCRIPTION OF THE DRAWINGS

Further features and advantages of the invention will be more apparent in light of the detailed description of a preferred, but not exclusive embodiment described as a function of an apparatus for the production of plastic containers of the injection-compression type, illustrated by way of non-limiting example, with the aid of the accompanying drawings, wherein.

DETAILED DESCRIPTION OF A PREFERRED EMBODIMENT OF THE INVENTION

Figure 1:
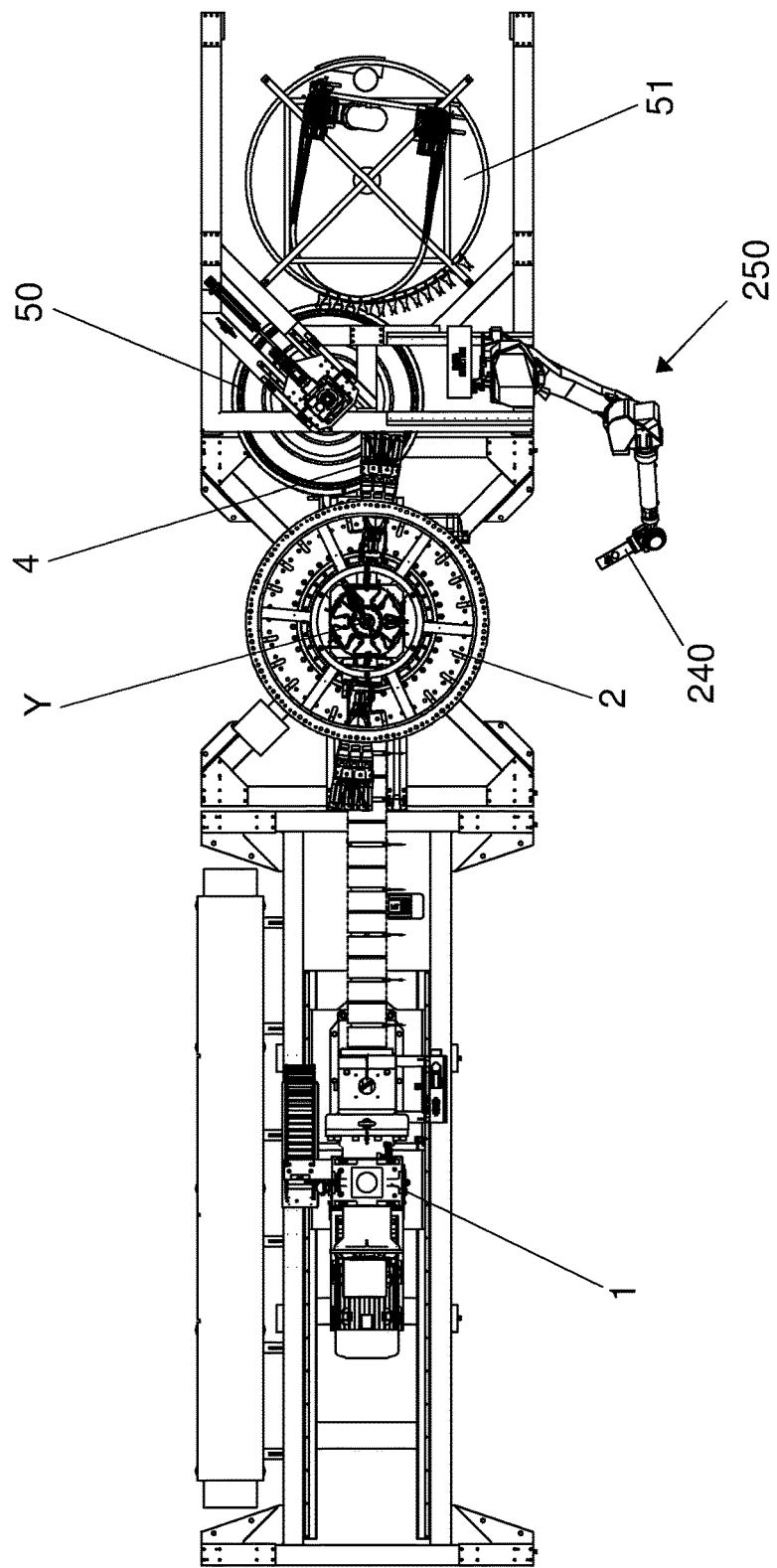
FIG. 1 shows a diagrammatic plan view of a production plant for thermoplastic preforms in which the transfer starwheel comprising the grippers according to the invention is incorporated.

In order to increase production capacity, the preform production capacity must be adapted to the production speed of the blowing process as much as possible, and this can occur by using an injection-compression process in particular. FIG. 1 is a diagrammatic plan view of an injection-compression system of the rotary type, for containers made of thermoplastic material, typically preforms made of PET, for producing bottles or other containers for food or non-food use. One of the advantages of an injection-compression plant is that of higher preform productivity because the carousel can be turned at faster speed than other types of plants, the molds being arranged in different manner, allowing a consecutive, continuous production.

The plant in the FIG. 1, which is a high production capacity injection-compression rotary preform production plant for which the gripper of the invention is particularly suited, comprises at least one extruder 1, of known type, the function of which is to plasticize the polymer transforming it from the granular solid state to the fluid state, thus producing molten resin. The preform injection-compression molding rotary carousel 2, rotating about a vertical axis Y, is arranged downstream of the extruder.

Once cooled, the preforms must then be transferred by means of the transfer starwheel 50 to a downstream cooler 51 to be cooled. This transfer starwheel 50 is provided with a plurality of grippers 4 on its periphery, all perfectly equal to one another, the function of which is to grasp the preforms in continuous manner allowing the transfer starwheel 50 to keep the speed suited to the rotation of the rotary carousel 2, and to transfer them to the cooler 51 where they will be further processed.

The typical configuration of a two-stage container production plant is shown in FIG. 1. A person skilled in the art will appreciate that, without departing from the scope of the invention, a blowing machine, which is generally rotary, with the corresponding accessory devices of the type known in the art, such as preform transfer, cooling and/or conditioning wheels, heating ovens, etc., can be associated to the injection-compression apparatus instead of the preform cooling device 51. If needed, other machines, for example for labeling the containers and filling them with the intended product, can be inserted in the system. In order to better deal with the increased production capacity needs, a suitable transfer capacity of the transfer starwheel, and thus the capacity to carry out fast, accurate movements, must be guaranteed in these plants.

The grippers of the invention, described with particular reference to the figures, were made in order to guarantee these high level needs for the transfer starwheel.

Figure 2:
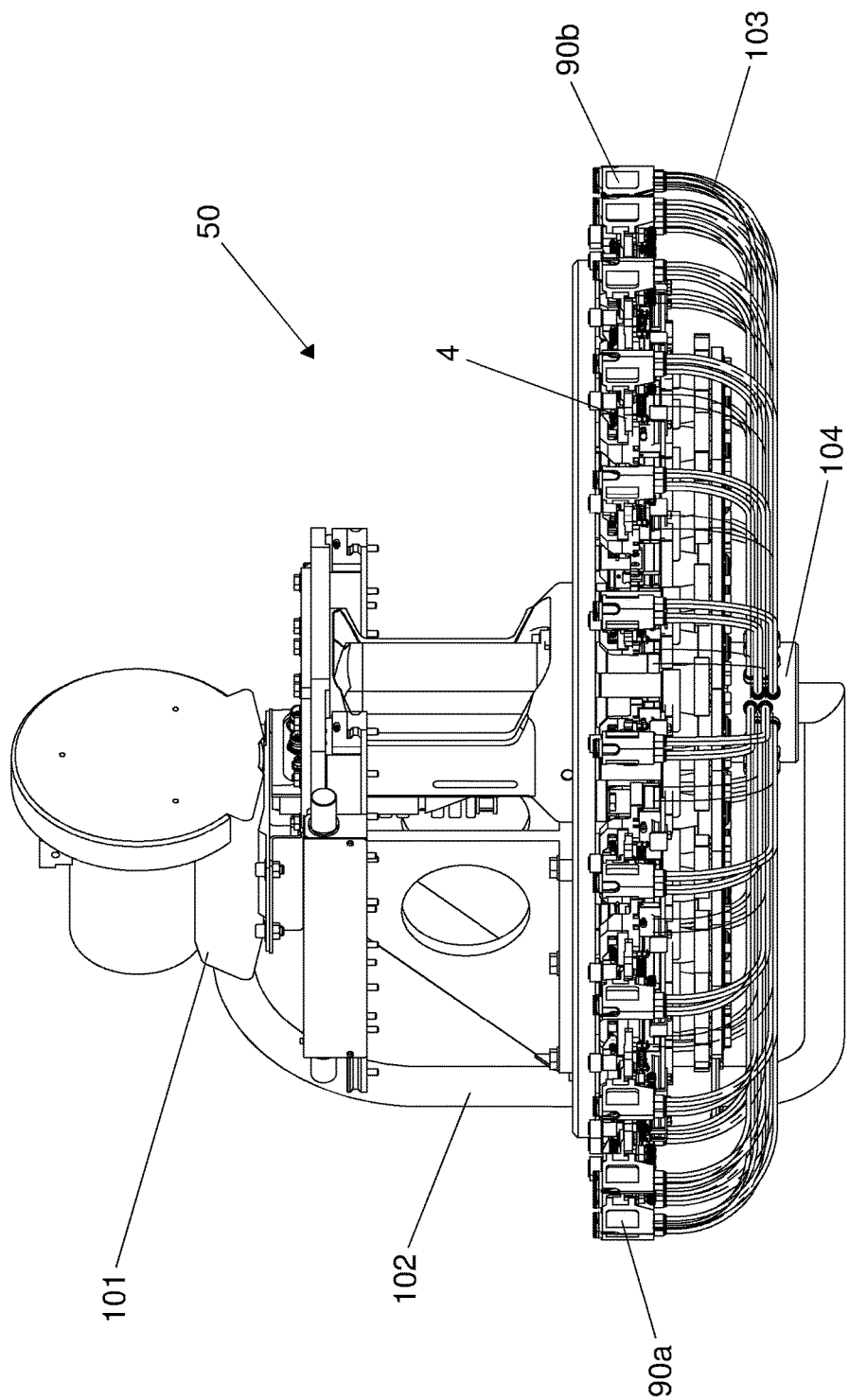
FIG. 2 shows a front view of the transfer starwheel according to the invention.
Figure 3:
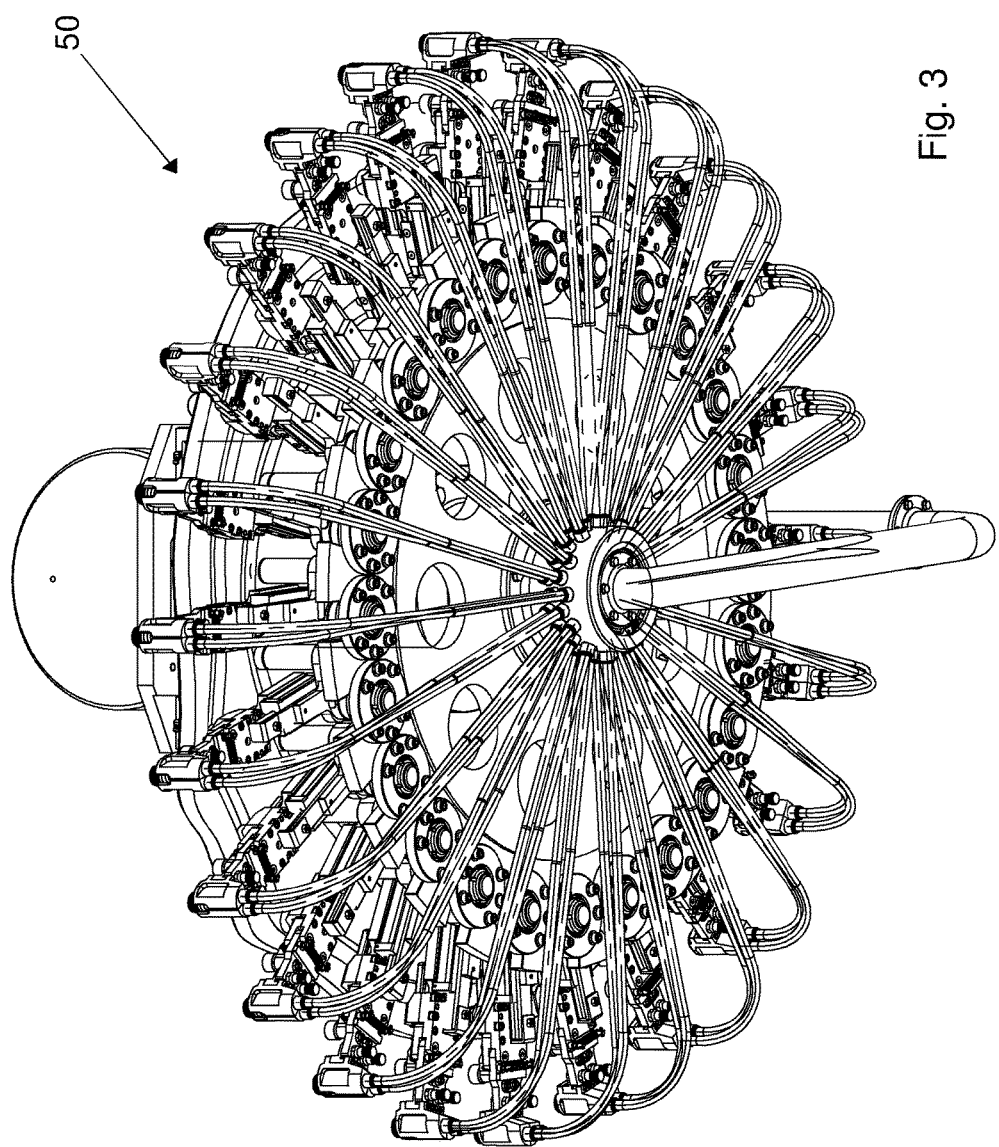
FIG. 3 shows a bottom perspective view of the same transfer starwheel.
Figure 4:
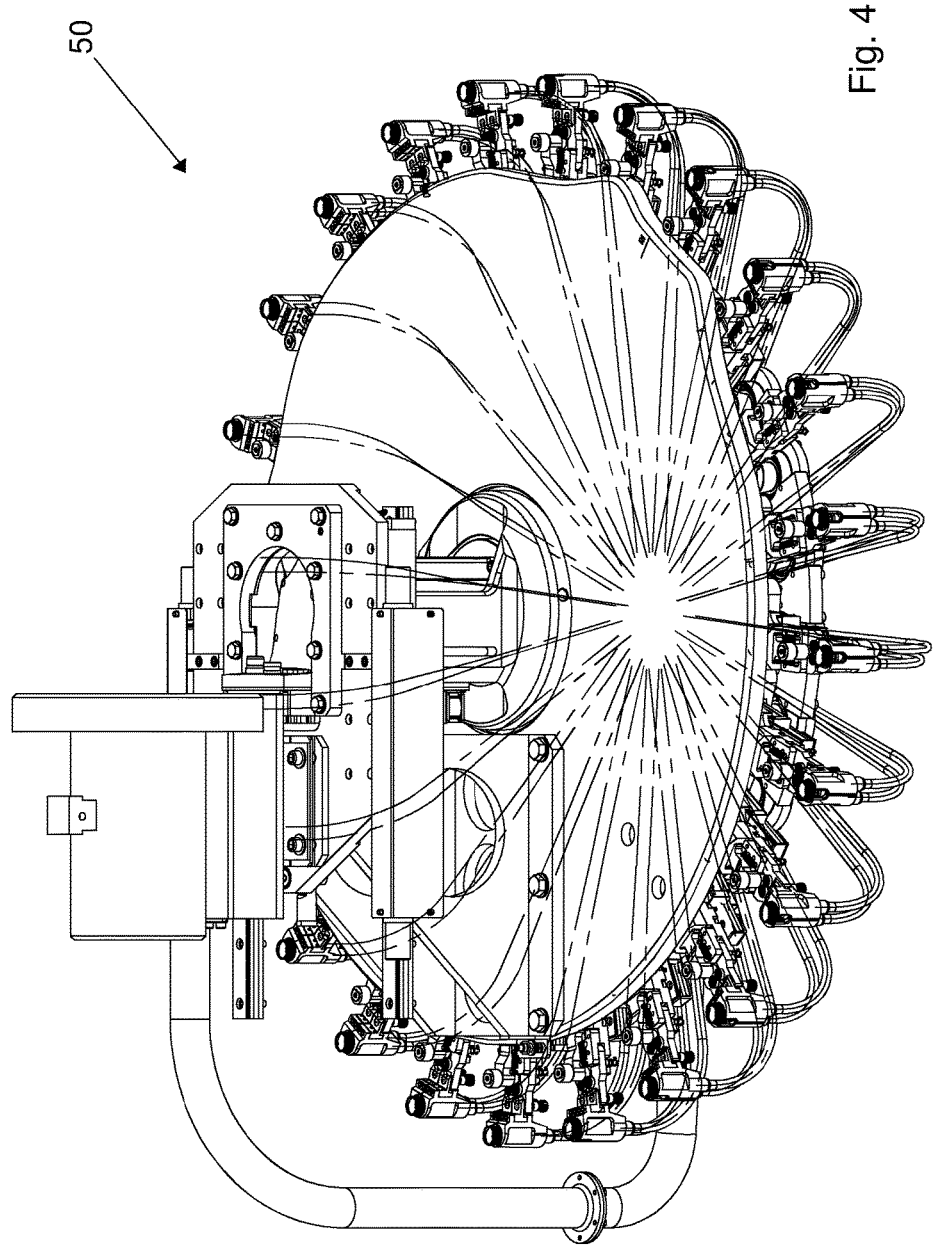
FIG. 4 shows a top perspective view of the same transfer starwheel.
Figure 5:
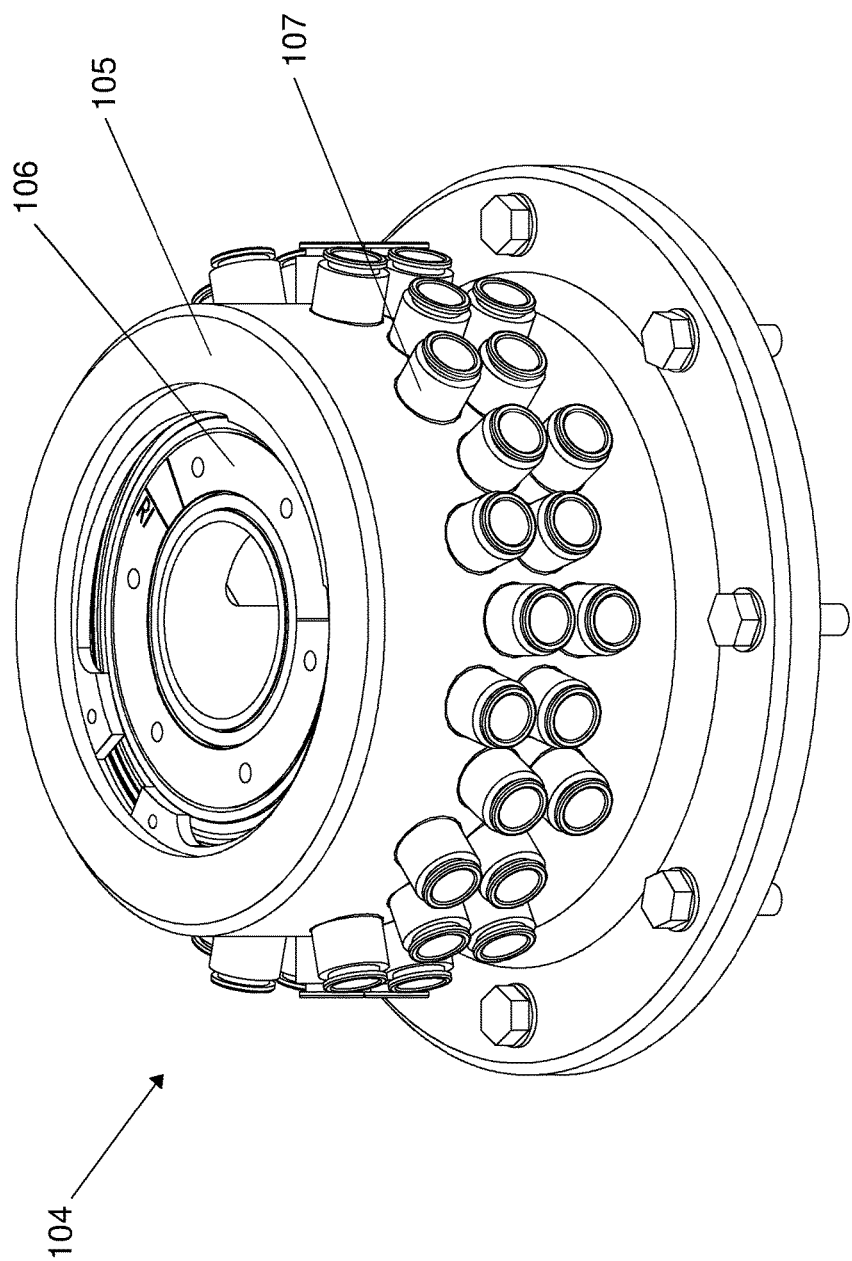
FIG. 5 shows a perspective view of the distribution valve of the suction system.

The transfer starwheel 50 is shown in front view in FIG. 2, in axonometric bottom view in FIG. 3, and in axonometric top view in FIG. 4. The transfer starwheel 50 comprises a cylindrical carousel defining an upper disc and a lower disc, which are concentric to each other, and comprises a series of grippers 4 radially fixed along the periphery of the lower disc. A suction system 101 provided with an appropriate pump is mounted in the middle of the transfer starwheel 50 on the outer surface of the upper disc. A pipe 102 is connected to a pneumatic distribution valve 104 (FIG. 5), arranged in the middle of the outer surface of the lower disc of the transfer starwheel 50. The pneumatic distribution valve 104 consists of two concentric cylinders, in which the outer cylinder 105 is integral with the transfer starwheel 50 and can rotate about a rotation axis coinciding with the rotation axis of the transfer starwheel 50. The inner cylinder 106 is fixed and connected to the pipe 102. The outer cylinder 105 is provided along the outer surface thereof with a series of fluid-tight connections 107 to which flexible tubes 103, which connect the suction system to the grippers 4, are fixed; there are two flexible tubes 103 for each gripper 4, one for each of the jaws 90a and 90b of the grippers 4. Each connection 107 is in communication with a radial passage, which puts the outer surface of the side wall of the outer cylinder into communication with its inner surface. The fixed cylinder 106 is provided with an opening which crosses the side wall thereof. At least one pair of passages, which are located in the side wall thereof, is located at the opening in the side wall of the fixed inner cylinder 106 as the outer cylinder rotates. A pair of connections 107 corresponds to said pair of passages, which connections are in communication with the gripper, which in that given instant must grasp the preform released from the molding module during rotation, by means of two flexible tubes 103. In this manner, only one of the grippers works in suction mode at a time, with a considerable saving of energy. It is apparent that several grippers 4 may work in suction mode simultaneously according to the molding system as a function of the width of the opening which crosses the side wall of the fixed cylinder 106.

Figure 6:
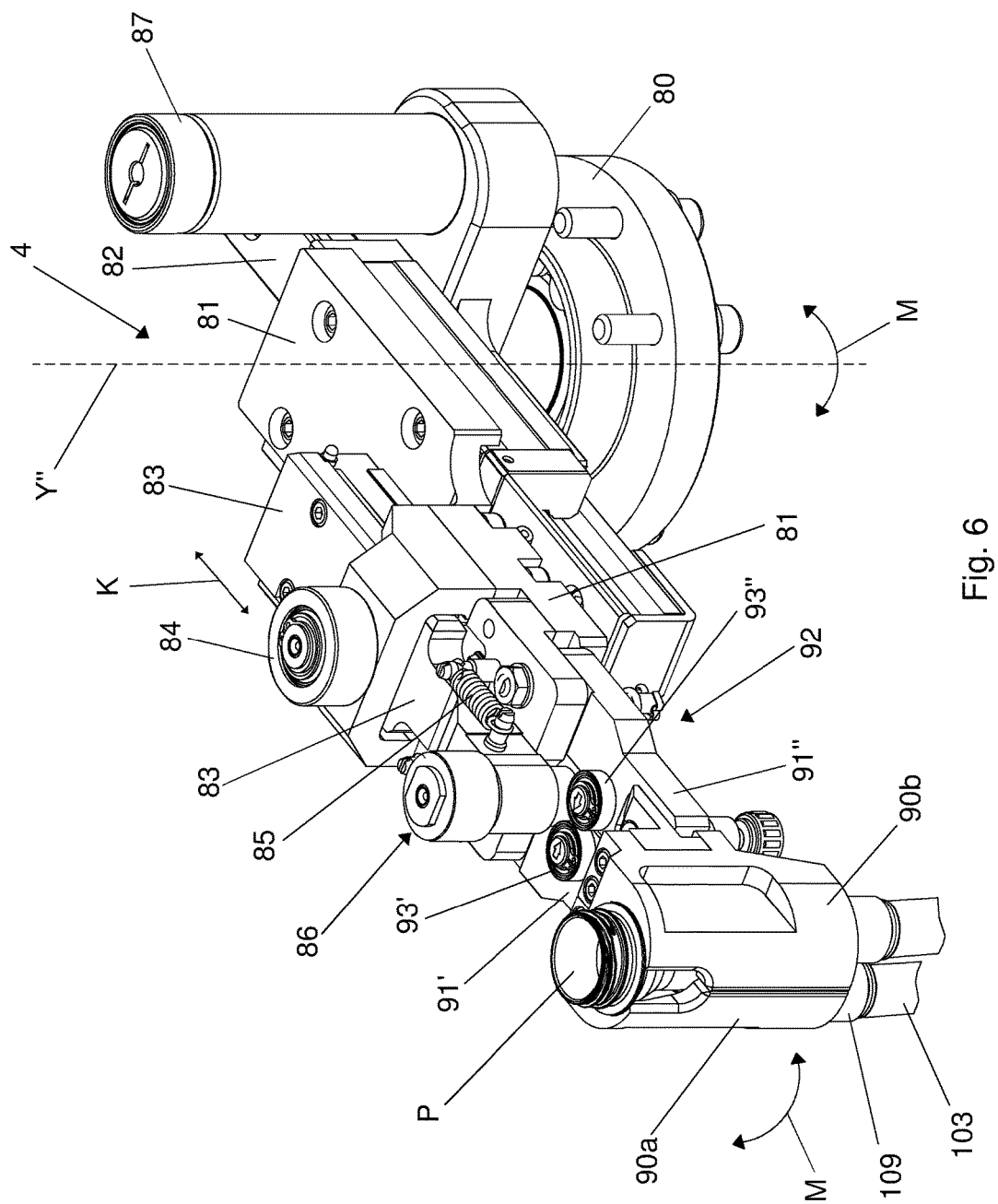
FIG. 6 shows a perspective view of suction grippers according to the invention.

The grippers 4 for a transfer starwheel are preferably all of the same type, and one will now be described with reference to FIG. 6, which illustrates its details, it being understood that other grippers have the same features. FIG. 6 is a perspective view of a gripper, indicated by reference numeral 4, with a preform P held between the two jaws 90a and 90b, which form the head of the gripper. The two jaws 90a and 90b are separately bolted to the free end of two arms 91' and 91". This device facilitates the maintenance or the changing only of the jaws of the grippers to adapt them to other container sizes.

Figure 7:
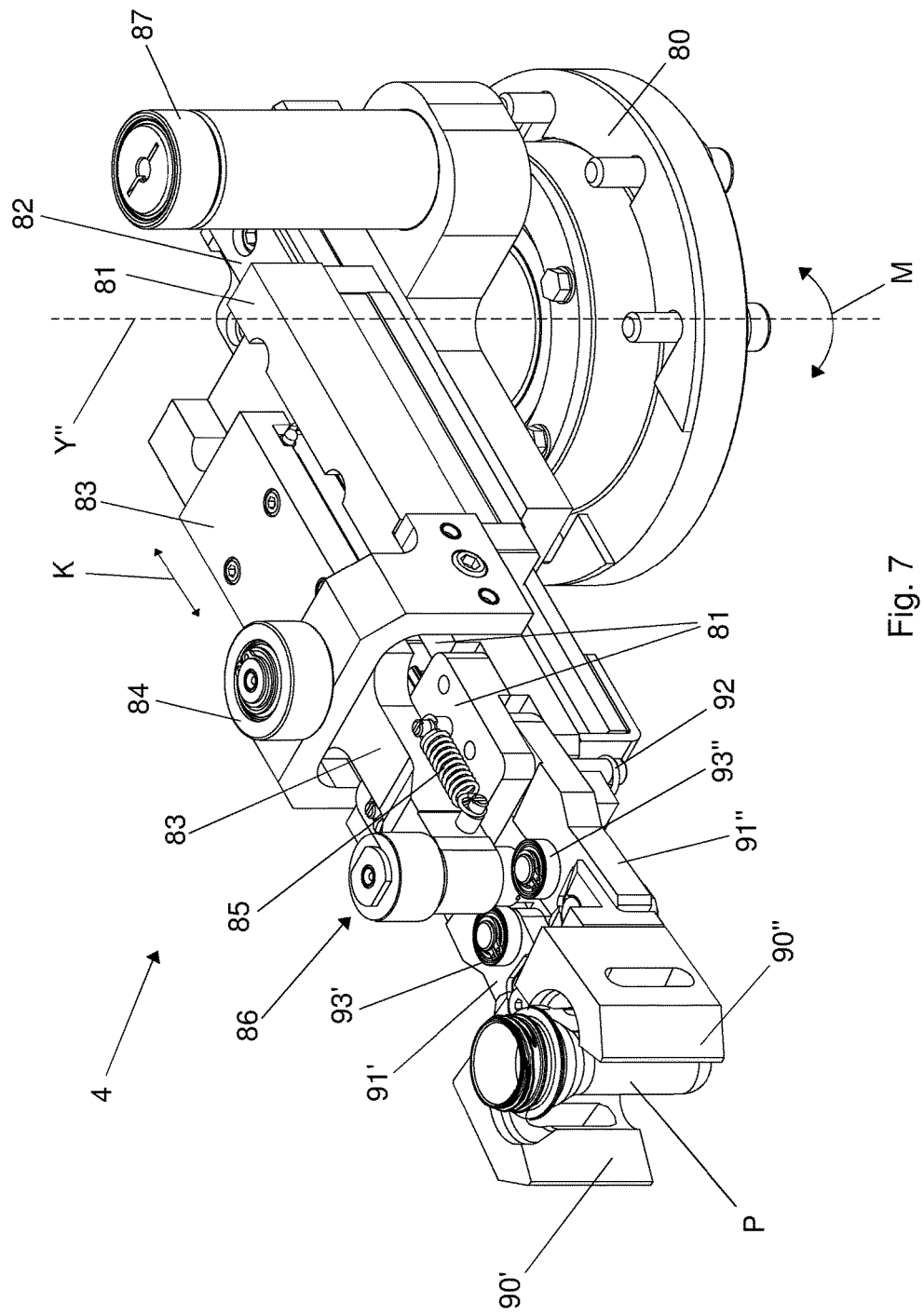
FIG. 7 shows a perspective view of non-suction grippers according to the invention.

Indeed, FIG. 7 shows the same grippers 4 provided with a type of jaws 90' and 90" non equipped with a suction system.

Figure 8:
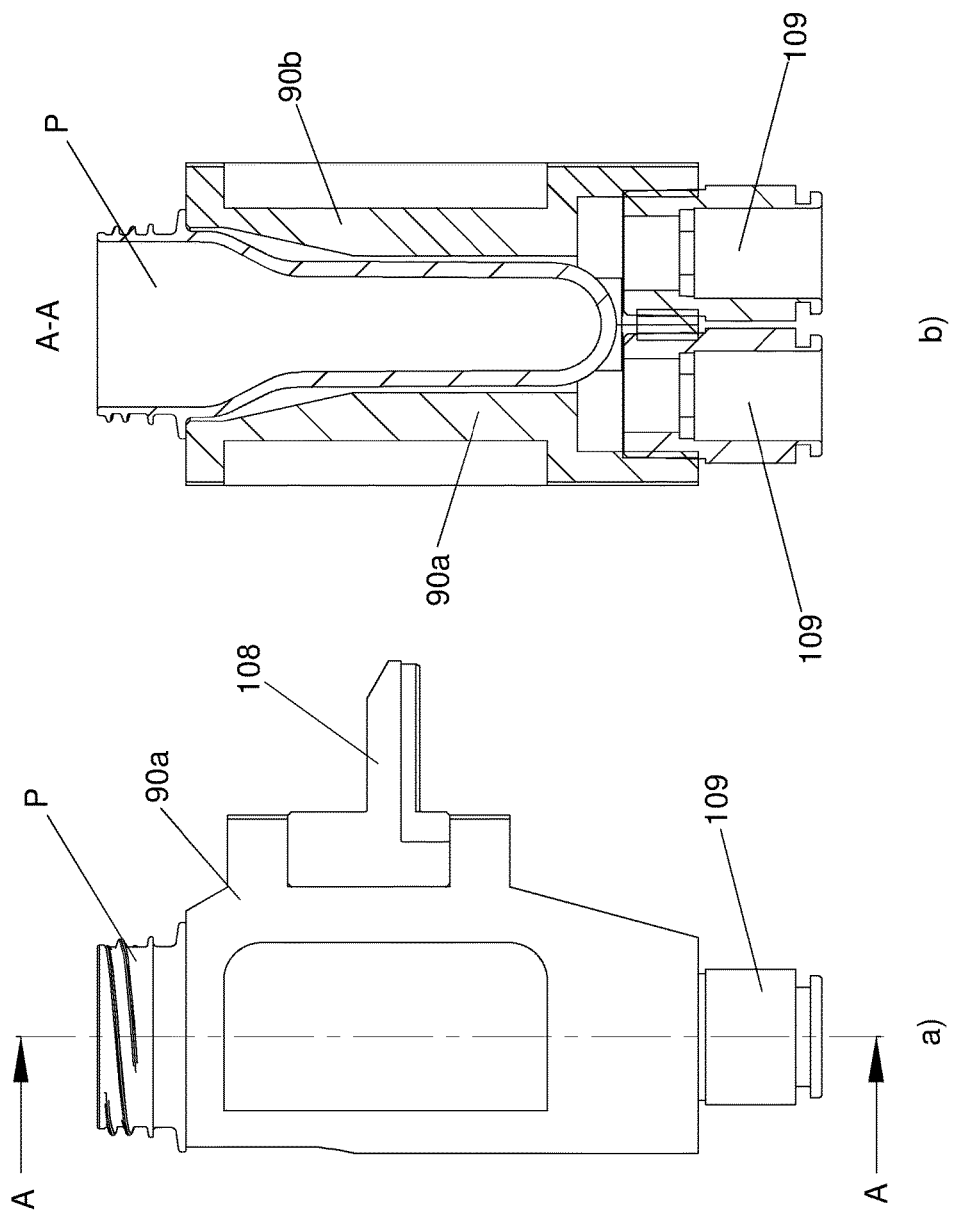
FIG. 8 shows the jaws of the suction gripper.

Turning back to FIG. 6, the jaws 90a and 90b of the grippers 4 are connected by means of two flexible tubes 103 to the suction system. FIG. 8A shows a side view of the suction jaws 90a and 90b in closed position with the preform P in the seat formed by the two closed jaws, as shown in greater detail in FIG. 8b, which shows a section taken along the plane A-A. Each jaw is provided with a connection 109 for connecting the flexible tubes 103. A side extension 108 allows to connect and fasten the jaws by means of bolts to the two arms 91' and 91". The arms 91' and 91" are, in turn, hinged by the other ends by means of pins to a first slide 81 which belongs to a telescopic arm which defines a longitudinal axis. The grippers 4 are provided with a translating-rotating movement achieved by means of cam mechanisms, and another cam mechanism is also responsible for grasping and releasing the preform, together with the suction system. A return spring 92, which connects the two arms 91' and 91" and holds them, and thus the two jaws 90a and 90b, clamped against each other, allowing to grasp the preform P. The two arms 91' and 91" are each provided with a roller, which is free to rotate according to an axis perpendicular to the longitudinal axis. The two rollers 93' and 93", as described below, are used to open and close the jaws 90a and 90b. The first slide 81 may run along the longitudinal axis thereof on a first rail 82, thereby forming a telescopic system. The first rail 82, in turn, is free to pivot about a vertical axis Y" thereof passing through the middle of a support 80 which connects the grippers 4 to the transfer starwheel 50. The pivoting of the first rail 82 about the vertical axis Y" is controlled by a rocker cam system formed by a roller follower 87, placed in eccentric position with respect to axis Y" by an appropriate cam surface, not shown, and by a return device, also not shown. With this device, the head of the grippers may perform a pivoting movement, represented by the arc M, on a plane perpendicular to axis Y". Another cam mechanism, formed by a translating roller follower 84 integral with the first slide 81 and by an appropriate cam surface and respective return device, not shown, is responsible for the movement of said slide 81 along the longitudinal axis, and thus of the similar movement of the head of the gripper, allowing the latter to move away from the point of the path in which the preform must be grasped and to the point in which it must be deposited. The combination of this translating motion of the slide 81, represented by the arrow K, with the rotary motion of the rail 82, indicated by the arrow M, allows the grippers 4 to cover a large surface and to follow complex preform conveying paths. Another cam mechanism, which is used to open and clamp the two jaws 90a and 90b of the grippers 4, is independent from these two mechanisms. A second slide 83, which may run along the longitudinal axis of the first slide 81, and which thereby serves as a second rail for said second slide 83, is arranged on the free horizontal surface of the first slide 81. The longitudinal pivoting movement of the second slide 83 is controlled by the roller-tappet 86 integral with the second slide 83, by the respective cam surface, not shown and by a spring 85, which applies a return force onto the second slide 83 with respect to the first slide 81, thus making the roller-tappet 86 adhere to the respective cam surface. The second slide 83 by moving along the direction of the arrow K in direction of the preform P is wedged between the two rollers 93', 93" integral with the two arms 91' and 91" to which the two jaws 90a and 90b are coupled, which in this manner can move away from each other thus releasing the preform P.

The described gripper 4 offers many advantages and considerable simplicity, and by virtue of the independent cam mechanisms can carry out very complex, high speed and high accuracy movements, the latter being an extremely important factor for facilitating the automation and the synchronization between the various wheels of the plant and avoiding mechanical damage to the preforms.

Furthermore, it is worth noting that no friction is applied to the preform by the jaws 90a and 90b, which close completely on the preform only once the preform is correctly positioned in its seat by virtue of the suction system.

Figure 9:
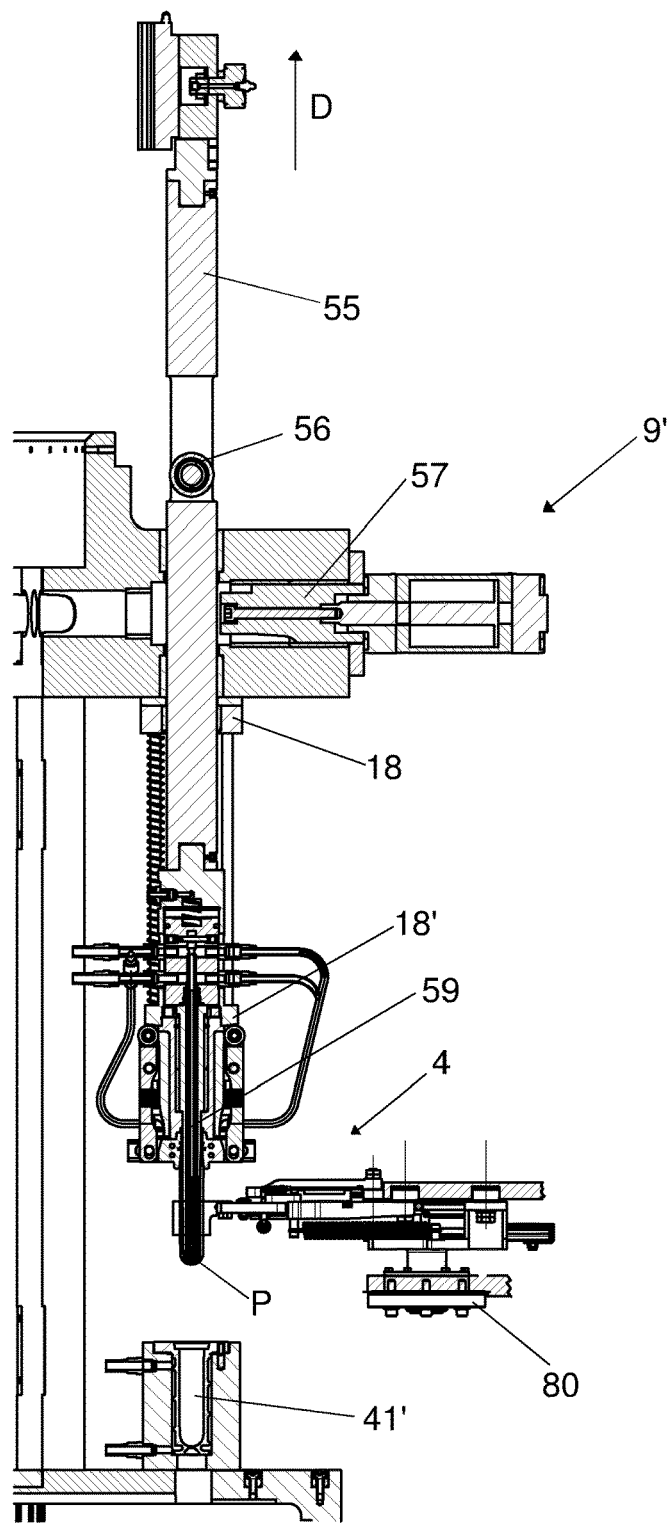
FIG. 9 shows the same molding module during the step of extracting the preform from the mold.
Figure 10:
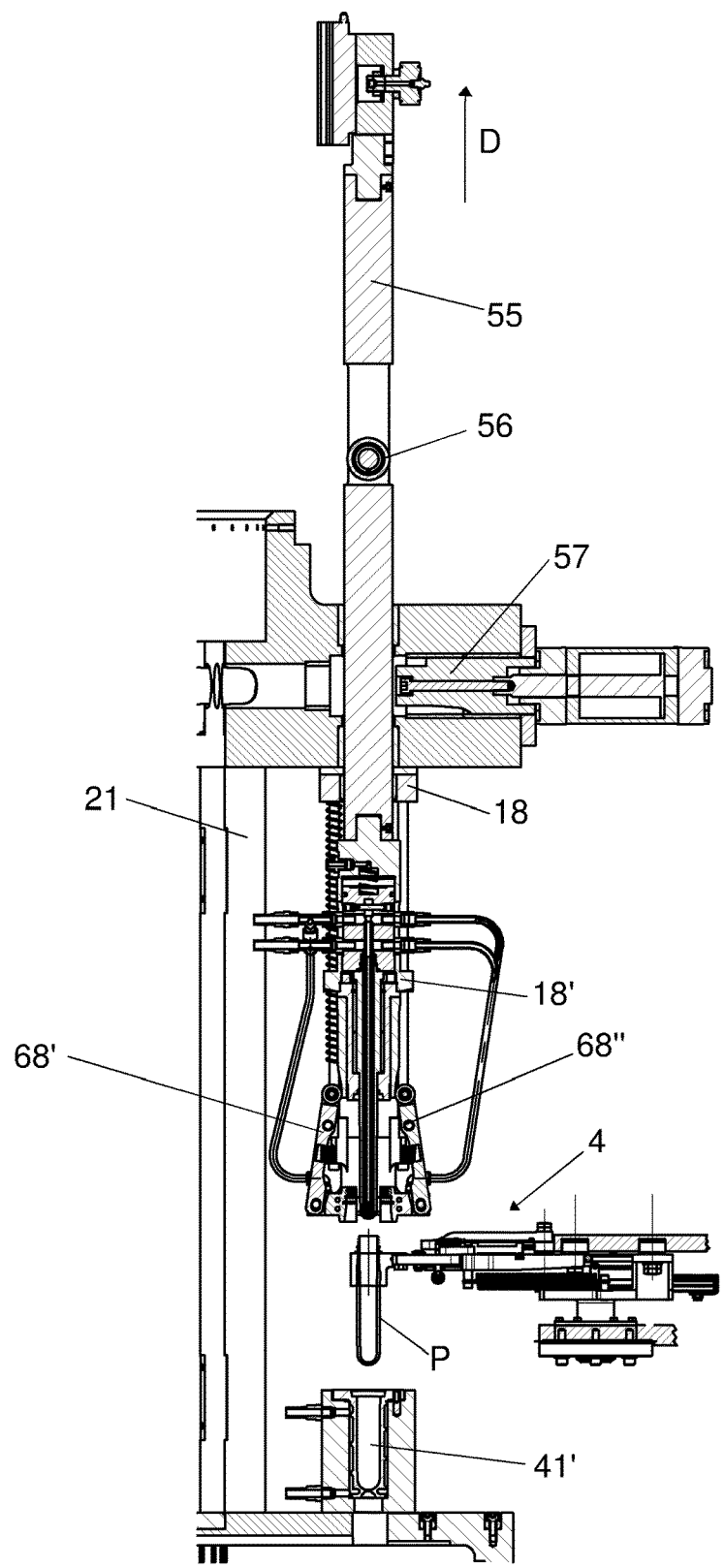
FIG. 10 shows the preform free from the molding module and engaged by the transfer grippers.

Even if the suction system is not present on the grippers or is not activated because of the heavy weight of the preforms, the preform may be correctly positioned by virtue of its weight and the shape of the jaws themselves, which guarantee keeping of the vertical axis position of the preform in the transfer inside the grippers when it is detached from the punch of the injection-compression mold. An operating mode of the picking system of the preform from the mold of the injection-compression plant by means of the grippers 4 of the invention is described below. FIGS. 9 and 10 show side views of a vertical section of a preform mold 9' belonging to the rotary carousel 2 of the injection-compression plant in FIG. 1 in two different steps of extracting the preform P from the punch 59 of the mold. After having extracted the preform P from the cavity 41' by lifting the rod 55 along direction D, the grippers 4 are positioned with the jaws 90a and 90b in open position about the preform P, in a lower position. The extraction device 18' is activated and keeps the preform stationary while the punch 59 is lifted, and is thereby detached from the inside of the preform to which had stuck following the pressure exerted during the injection-compression. Upon detaching from the punch 59, the preform P drops into the jaws of the grippers 4, which clamp and grasp the preform to convey it along the arc of circumference needed to transport it to the point in which the preform is released. FIG. 10 shows the preform already detached from the punch 59 by retracting the latter along direction D. Thus, the presence of the grippers 4 is ensured when the preform P is released. Subsequently, the extraction of the preform P from the mold by the grippers 4 allows the re-closing of the mold by lowering the rod 55 to continue the injection-compression operations.

In the variant of grippers provided with suction system, when the grippers 4 are positioned under the preform P, i.e. in the position corresponding to that shown in FIG. 9, the jaws 90a and 90b are connected to the suction system by virtue of the positioning of the inner cylinder 106 of the distribution valve 104. In this manner, the preform P is subjected to the suction flow while it is removed from the punch 59, by activating the device 18', and finally the preform P is dropped, while it is aspirated, into the space defined between the jaws 90a and 90b, which are now in closed position.

These extraction operations of the preform P include the synchronization, by means of electromechanical means, of the upward movement of the punch 59 with the horizontal movement of the release mechanisms of the preform P, not described in detail, the movements of the gripper 4, and the movements of the other grippers on the transfer starwheel 50, which are in all cases within the average knowledge of a person skilled in the art.

The described suction system improves the accuracy and reliability with which the preforms, which are particularly light, are grasped by the grippers. Preforms of this type for bottles weighing less than twenty or so grams are particularly sensitive to the surrounding environment, and could undergo minor displacements with respect to the dropping vertical between the moment of release from the molding apparatus, or of cooling, and grasping by the grippers, which could compromise secure, damage-free grasping. The suction promotes the insertion of the preform into the specific seat formed by the closed jaws, even if the vertical symmetry axis of the preform is displaced with respect to the dropping vertical. The transfer starwheel which mounts the grippers according to the invention can guarantee reliable grasping by virtue of suction grippers and can also increase the operative capacities and promote a greater automation process.

As mentioned above, the grippers of the invention may also be advantageously used either without operating the suction system or without the presence of the constructive elements which guarantee the operation of the suction system on the grippers, as shown in the variant in FIG. 7. Such a use is effective for molding heavier preforms or for slower rotation speeds of the injection-compression carousel 2, in which such accentuated air turbulence phenomena caused by the rotation are less obvious.

The invention claimed is:

1. A gripper for plastic containers P adapted to be mounted on a brace, said gripper comprising:
   a telescopic arm defining a first longitudinal axis and formed by a first rail, adapted to be fixed by a support to said brace and to rotate about a second axis Y" perpendicular to said first longitudinal axis, and by a first slide, adapted to slide along said first longitudinal axis and provided with a free outer end, two arms having a first free end onto which respective jaws, are bolted and a second end hinged by pins to the free outer end of the first slide, said arms being adapted to assume a first extreme position, in which they are clamped onto each other by a return spring, and a second extreme position, in which they are separated from each other by rotating about the pins, said arms being each provided with a roller free to rotate about a respective third axis perpendicular to the first longitudinal axis of the gripper, a second slide, adapted to slide longitudinally along the first slide, and to be wedged between the two rollers, thus separating the first free ends of the two arms and, thus separating the two jaws from each other, characterized in that there are provided:

a first cam mechanism to make said telescopic arm rotate about the second axis Y", a second cam mechanism to make the first slide run on the first rail, said first slide having an inner end supported by the first rail during its movement, and a third cam mechanism to make the second slide run on the first slide.

2. The gripper according to claim 1, wherein said first cam mechanism is a rocker type with roller follower and return device.

3. The gripper according to claim 1, wherein said second cam mechanism is translatable with roller tappet and return device.

4. The gripper according to claim 1, wherein said third cam mechanism is translatable with roller tappet and return spring connected to the first slide.

5. The gripper according to claim 1, wherein the first, second and third cam mechanisms are independent from one another.

6. The gripper according to claim 1, wherein the two jaws are each connected by a respective flexible tube to a suction system so that a vacuum can be created in an inner space defined by the two jaws and which acts as seat for said plastic containers P.

7. A transfer starwheel for transferring thermoplastic preforms P in a container production plant, which comprises a cylindrical carousel defining an upper disc and a lower disc, which are concentric to each other, and a plurality of grippers according to claim 6 radially fixed along a periphery of the lower disc, and wherein the suction system is placed in the middle of an outer surface of the upper disc.

8. The transfer starwheel according to claim 7, wherein the suction system is connected by a suction pipe to a valve placed in the middle of an outer surface of said lower disc.

9. The transfer starwheel according to claim 8, wherein said valve consists of two concentric cylinders, wherein an outer cylinder of said two concentric cylinders is integral with the transfer starwheel and adapted to rotate about a central rotation axis coinciding with the rotation axis of the transfer starwheel, whereas an inner cylinder of said two concentric cylinders is fixed, being integrally connected to the suction pipe.

10. The transfer starwheel according to claim 9, wherein a plurality of hydraulic connections is fixed to an outer surface of the outer cylinder at passages which put the outer surface of said outer cylinder into communication with the inner surface of said outer cylinder.

11. The transfer starwheel according to claim 10, wherein each of said flexible tubes is connected to the suction system by one of said hydraulic connections.

12. The transfer starwheel according to claim 11, wherein said inner cylinder is provided, along a side wall thereof, with an opening which during the rotation of said outer cylinder coincides with at least two of the passages formed in the side wall of said outer cylinder, so that at least one pair of grippers is put into communication with the suction system by the two corresponding flexible tubes.

13. A continuous cycle, rotary-type plant for the production of plastic containers, in particular of PET preforms, comprising at least one preform injection-compression station and at least one transfer starwheel according to claim 7.

* * * * *